(12) United States Patent
Lee et al.

(10) Patent No.: US 12,491,539 B2
(45) Date of Patent: Dec. 9, 2025

(54) SENSOR CLEANING SYSTEM

(71) Applicants: HYUNDAI MOTOR COMPANY, Seoul (KR); KIA CORPORATION, Seoul (KR)

(72) Inventors: Seung Hyun Lee, Incheon (KR); Hae Jun Jeong, Siheung-si (KR); Yoon Geun Cho, Daegu (KR); Je Yeon Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 345 days.

(21) Appl. No.: 18/141,573

(22) Filed: May 1, 2023

(65) Prior Publication Data
US 2024/0181501 A1 Jun. 6, 2024

(30) Foreign Application Priority Data
Dec. 5, 2022 (KR) .................. 10-2022-0167581

(51) Int. Cl.
| | | |
|---|---|---|
| *B60S 1/52* | (2006.01) | |
| *B08B 3/02* | (2006.01) | |
| *B08B 5/02* | (2006.01) | |
| *B08B 5/04* | (2006.01) | |
| *B08B 13/00* | (2006.01) | |
| *B08B 17/00* | (2006.01) | |
| *B60S 1/48* | (2006.01) | |

(52) U.S. Cl.
CPC .................. *B08B 3/02* (2013.01); *B08B 5/02* (2013.01); *B08B 5/04* (2013.01); *B08B 13/00* (2013.01); *B08B 17/00* (2013.01); *B60S 1/48* (2013.01); *B08B 2240/00* (2013.01); *B60S 1/52* (2013.01)

(58) Field of Classification Search
CPC ...... B60S 1/48; B60S 1/52; B60S 1/56; B08B 3/02; B08B 5/02
See application file for complete search history.

(56) References Cited

U.S. PATENT DOCUMENTS

| | | | |
|---|---|---|---|
| 11,273,798 B2 | 3/2022 | Giraud | |
| 2013/0192014 A1* | 8/2013 | Jacobowitz | B60S 1/32 156/60 |
| 2014/0270379 A1* | 9/2014 | Snider | G06T 7/0008 382/104 |
| 2016/0339875 A1* | 11/2016 | Ina | B60S 1/522 |
| 2017/0225660 A1* | 8/2017 | Trebouet | G01S 17/93 |
| 2018/0272998 A1* | 9/2018 | Schmidt | B05B 7/2424 |
| 2018/0290632 A1* | 10/2018 | Rice | B60S 1/56 |
| 2019/0106086 A1* | 4/2019 | Giraud | B60S 1/0848 |

(Continued)

FOREIGN PATENT DOCUMENTS

KR 20180136981 A 12/2018

*Primary Examiner* — Michael D Jennings
(74) *Attorney, Agent, or Firm* — Lempia Summerfield Katz LLC (57) ABSTRACT

A sensor cleaning system for cleaning an environment sensor includes: an air cleaning system configured to clean an environment sensor by spraying compressed air; a washer fluid cleaning system configured to clean the environment sensor by spraying washer fluid onto the environment sensor; a suction cleaning system configured to suck around the environment sensor; and a controller configured to control the air cleaning system, the washer fluid cleaning system, and the suction cleaning system.

20 Claims, 4 Drawing Sheets

(56) References Cited

U.S. PATENT DOCUMENTS

| | | | |
|---|---|---|---|
| 2021/0300303 A1* | 9/2021 | Park | B60S 1/486 |
| 2022/0041138 A1* | 2/2022 | Hamilton | G02B 27/0006 |
| 2022/0306046 A1* | 9/2022 | Hayasaka | B60S 1/56 |
| 2023/0001890 A1* | 1/2023 | Davidson | G01S 17/931 |
| 2023/0120545 A1* | 4/2023 | Hamilton | B60S 1/54 |
| | | | 15/313 |
| 2023/0219589 A1* | 7/2023 | Suh | B60K 35/22 |
| | | | 340/438 |
| 2023/0242080 A1* | 8/2023 | Krishnan | G01S 17/931 |
| | | | 701/36 |
| 2024/0034278 A1* | 2/2024 | Herse | B60S 1/487 |
| 2024/0051501 A1* | 2/2024 | Castellanos | B60S 1/54 |
| 2024/0083392 A1* | 3/2024 | Forsythe | B60S 1/0848 |

* cited by examiner

SENSOR CLEANING SYSTEM

CROSS REFERENCE TO RELATED APPLICATION

The present application claims priority to Korean Patent Application No. 10-2022-0167581, filed Dec. 5, 2022, the entire contents of which are incorporated herein for all purposes by this reference.

BACKGROUND OF THE DISCLOSURE

Technical Field

The present disclosure relates to a sensor cleaning system. More particularly, the present disclosure relates to a sensor cleaning system for cleaning an environment sensor.

Description of the Related Art

Recently, vehicles are equipped with a driver assistance system that assists the driver of the vehicle to ensure safe driving in various driving situations. In addition, research and development on autonomous vehicles, which can drive without a driver's intervention, are being actively conducted.

In a driver assistance system or an autonomous vehicle, various types of environment sensors are mounted on a vehicle that may sense surrounding environment in various ways. Examples of the environment sensors mounted on the vehicle may include a radar, a lidar, a camera, and the like.

Since these sensors are mounted on the outside of the vehicle, a sensing area of a sensor may be easily soiled by foreign substances or contaminants, such as dust, rain, dirt, or snow. In order to maintain sensor performance, these sensors should be kept clean above a certain level. To this end, the vehicle is provided with a sensor cleaning system that may clean the sensor when the sensing area is contaminated.

SUMMARY OF THE DISCLOSURE

Accordingly, the present disclosure has been made keeping in mind the above problems occurring in the related art. An objective of the present disclosure is to provide a sensor cleaning system that can provide effective and satisfactory cleaning performance.

The objectives of the present disclosure are not limited to the above-mentioned objective. Other objectives, which are not mentioned herein should be more clearly understood by those having ordinary skill in the art from the following description.

The characteristics of the present disclosure for accomplishing the above-described objective of the present disclosure and performing the characteristic function of the present disclosure that will be described later are as follows.

The present disclosure provides a sensor cleaning system. The system includes: an air cleaning system configured to clean an environment sensor by spraying compressed air; a washer fluid cleaning system configured to clean the environment sensor by spraying washer fluid onto the environment sensor; a suction cleaning system configured to suck around the environment sensor; and a controller configured to control the air cleaning system, the washer fluid cleaning system, and the suction cleaning system.

According to an embodiment of the present disclosure, a vehicle includes the sensor cleaning system.

The present disclosure provides a method for controlling a sensor cleaning system. The method includes a number of steps performed by a controller. These steps include: receiving a first cleaning request for an environment sensor; causing an air cleaning system to spray compressed air onto the environment sensor; causing a washer fluid cleaning system to clean the environment sensor using washer fluid after the spray of the air cleaning system; and causing a suction cleaning system to suck material around the environment sensor after the cleaning of the washer fluid cleaning system.

According to the present disclosure, a sensor cleaning system is provided that is capable of providing effective and satisfactory cleaning performance.

Effects of the present disclosure are not limited to the above-mentioned effects Other effects, which are not mentioned herein should be more clearly understood by those having ordinary skill in the art from the following description.

BRIEF DESCRIPTION OF THE DRAWINGS

The above and other objectives, features, and other advantages of the present disclosure should be more clearly understood from the following detailed description when taken conjointly with the accompanying drawings, in which.

DETAILED DESCRIPTION OF THE DISCLOSURE

Specific structural or functional descriptions in the embodiments of the present disclosure are only for describing the embodiments of the present disclosure. The present disclosure may, however, be embodied in many different forms and should not be construed as being limited to only the embodiments set forth herein. The present disclosure should be construed as covering modifications, equivalents, or alternatives falling within the ideas and technical scope of the present disclosure.

It should be understood that, although the terms "first," "second," etc., may be used herein to describe various elements, these elements should not be limited by these terms. These terms are only used to distinguish one element from another element. For example, without departing from the scope of rights according to the concept of the present disclosure, a first element may be referred to as a second element. Likewise, the second element may also be referred to as the first element.

It should be understood that, when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between," "adjacent to," or "directly adjacent to" should be construed in the same way.

The same reference numerals are used throughout the drawings to designate the same or similar components. The terminology used herein is for the purpose of describing particular embodiments only and is not intended to be limiting. In the present disclosure, the singular forms are intended to include the plural forms as well, unless the context clearly indicates otherwise. It should be further understood that the terms "comprise." "include," "have," and the like, and variations thereof, when used in this specification, specify the presence of stated features, integers, steps, operations, elements, components, and/or combinations of them but do not preclude the presence or addition of one or more other features, integers, steps, operations, elements, components, and/or combinations thereof. When a component, device, element, or the like, of the present disclosure, is described as having a purpose or performing an operation, function, or the like, the component, device, or element should be considered herein as being "configured to" meet that purpose or to perform that operation or function.

Hereinafter, embodiments of the present disclosure are described in detail with reference to the accompanying drawings.

As described above, in order to maintain the performance of an environment sensor that senses the surrounding environment of a vehicle, periodic cleaning of the surface of the sensor is required. For instance, the environment sensor may be contaminated by solids, such as dust, dirt, or sand, and may be stained by liquids, such as raindrops or snow during precipitation.

Particularly, in an active autonomous vehicle, vehicle driving is performed based on surrounding environment information, such as a traffic light, a pedestrian, a road type, a building, or a surrounding vehicle recognized by the environment sensor. If the surface of the environment sensor is contaminated, it becomes difficult or impossible to recognize the surrounding environment and thus active autonomous driving becomes impossible. Therefore, a sensor cleaning system for the vehicle helps the environment sensor to clearly recognize the surrounding environment without distortion and performs an important function to enable driving by removing contaminants from the surface of the sensor.

The environment sensor may be washed using washer fluid or high-pressure air. In the former, the sensor may be washed using the washer fluid and moisture on the sensor may be removed by blowing air. In the latter, foreign substances or contaminants are removed from the surface of the sensor merely by blowing high-pressure air. Further, there may also be sensor cleaning systems that combine these methods differently.

After cleaning by the washer fluid, it often happens that the washer fluid splashes on the surface of the vehicle around the environment sensor. Further, when the high-pressure air is sprayed after cleaning by the washer fluid, the washer fluid or foreign substances remaining in the environment sensor may splash around, causing damage to the vehicle and nearby pedestrians.

Accordingly, the present disclosure is intended to provide a sensor cleaning system that can keep the appearance of the vehicle clean after the sensor is cleaned, prevent damage from occurring due to washer fluid or contaminants remaining around the vehicle, and effectively wash the environment sensor.

Figure 1:
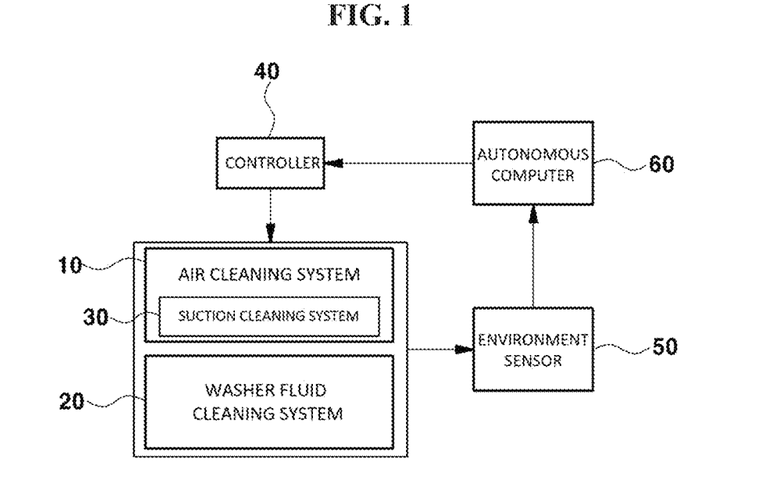
FIG. 1 is a diagram illustrating the configuration of a sensor cleaning system according to an embodiment of the present disclosure.

Referring to FIG. 1, according to an embodiment of the present disclosure, the sensor cleaning system includes an air cleaning system 10, a washer fluid cleaning system 20, and a suction cleaning system 30. The driving of the respective system of the sensor cleaning systems, i.e., the air cleaning system 10, the washer fluid cleaning system 20, and the suction cleaning system 30 may be controlled by a controller 40. The controller 40 may control the operation of each component of the sensor cleaning system.

Figure 2:
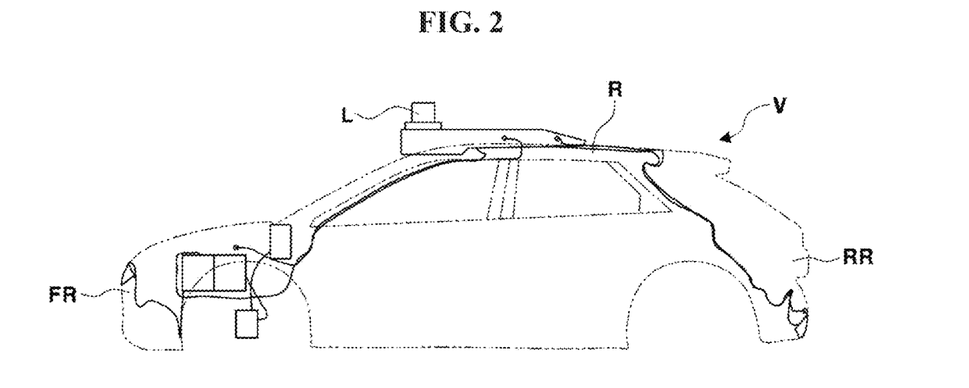
FIG. 2 schematically illustrates a vehicle equipped with an environment sensor.
Figure 3:
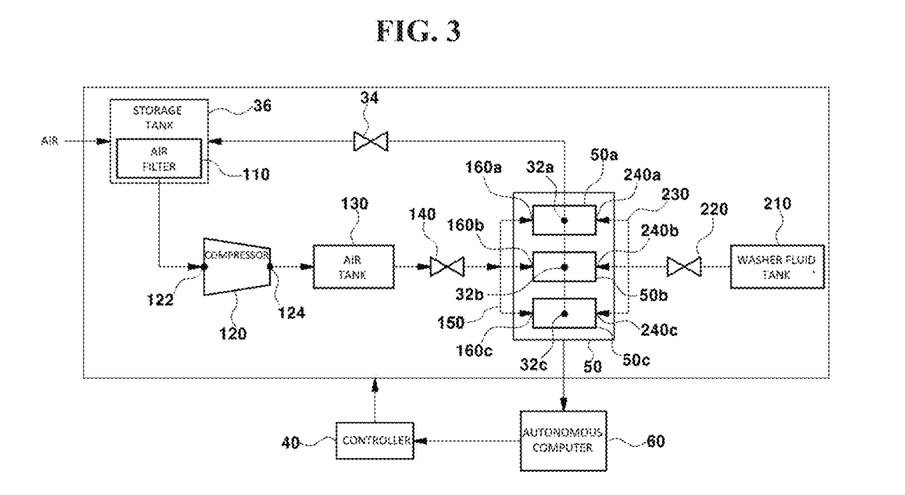
FIG. 3 is a detailed view of the sensor cleaning system of FIG. 1.

The sensor cleaning system is configured to clean an environment sensor 50. The environment sensor 50 may include one or more sensors configured to sense the surrounding environment of the vehicle V and may include, as a non-limiting example, a lidar L (as an example of a sensor 50), a radar, a camera, or the like. Here, the environment sensor 50 may be installed in a front FR, a rear RR, or a roof R of the vehicle V, as shown in FIG. 2. Although three environment sensors 50*a*, 50*b*, 50*c* (collectively, 50) are shown in FIG. 3, the present disclosure is not limited to this number. The number of sensors 50 may be increased or reduced.

The sensor cleaning system may be configured to execute cleaning when the contamination of the environment sensor 50 is sensed. In some implementations, the contamination of the environment sensor 50 may be sensed by an autonomous computer 60 of the vehicle V and the contamination information may be transmitted to the controller 40. For example, when the environment sensor 50 is contaminated, the autonomous computer 60 of the vehicle V recognizes that the cleaning of the environment sensor 50 is required. Then the autonomous computer 60 may instruct the controller 40 to drive the sensor cleaning system. For example, the autonomous computer 60 may determine that cleaning is required when a certain proportion of an area of the environment sensor 50, e.g., 25% is contaminated. The autonomous computer 60 may be a computing device that controls the autonomous driving of the vehicle V. In some implementations, the autonomous computer 60 may be omitted and the controller 40 of the sensor cleaning system may directly recognize the contamination of the environment sensor 50 and perform sensor cleaning. The computer 60 and/or the controller 40 may include a processor or microprocessor, a memory or storage, and one or more algorithms run by the processor(s) or microprocessor(s), as is known in the art, for operating the sensor cleaning system.

FIG. 3 is a detailed view illustrating the sensor cleaning system of FIG. 1.

Referring to FIG. 3, the air cleaning system 10 may generate compressed air and spray the compressed air onto the environment sensor 50 to perform cleaning. First, air required to generate the compressed air is sucked or drawn into the system. Impurities of the sucked air are filtered by an air filter 110. The filtered air is directed to a compressor 120. The filtered air is introduced through an inlet 122 into the compressor 120, and the compressor 120 generates compressed air and fills the generated compressed air through an outlet 124 into an air tank 130.

An air valve 140 is provided downstream of the air tank 130. The air valve 140 may be, for example, a solenoid valve. Further, the air valve 140 may be integrated with an air distributor 150 or may be configured to communicate therewith. The air distributor 150 may guide the compressed air from the air tank 130 to the environment sensor 50, i.e., sensors 50*a*, 50*b*, 50*c*, disposed in each of various places on the vehicle V. To this end, the operation of the air valve 140 may be controlled by the controller 40. Each environment sensor 50 may be provided with an air nozzle 160*a*, 160*b*, 160*c* (collectively, 160) so that the environment sensor 50 may be cleaned while the guided compressed air may be sprayed through the air nozzle 160.

The washer fluid cleaning system 20 is configured to perform cleaning by spraying washer fluid onto the environment sensor 50. A washer fluid tank 210 contains washer fluid that is to be supplied to the environment sensor 50, i.e., the sensors 50, 50*b*, 50*c*. A washer fluid valve 220 may be connected downstream of the washer fluid tank 210, and the operation of the washer fluid valve 220 may be controlled by the controller 40. If the washer fluid valve 220 is opened, the washer fluid flows through the washer fluid distributor 230 toward each environment sensor 50*a*, 50*b*, 50*c* (collectively, 50). In some implementations, the washer fluid valve 220 and the washer fluid distributor 230 may be integrated with each other. Cleaning is performed by the washer fluid while the washer fluid is sprayed onto the environment sensor 50 through a washer fluid nozzle 240*a*, 240*b*, 240*c* (collectively, 240) provided in each of the environment sensors 50*a*, 50*b*, 50*c* (collectively, 50). In particular, the washer fluid cleaning system 20 may perform the function of secondarily removing contaminants on the environment sensor 50 that have not been removed after the air cleaning.

The suction cleaning system 30 may suck material from around the environment sensor 50. To this end, a suction nozzle 32*a*, 32*b*, 32*c* (collectively, 32) is disposed around or on a side of each of the environment sensors 50*a*, 50*b*, 50*c* (collectively, 50). Material sucked by the suction nozzle 32 is guided to the storage tank 36 that is provided with the air filter 110. The storage tank 36 may prevent material such as sucked contaminants from escaping out of the storage tank 36. A suction valve 34 may be operated and controlled by the controller 40 and installed between the storage tank 36 and the suction nozzle 32. If the suction valve 34 is opened to perform suction cleaning, washer fluid or foreign substances remaining on the environment sensor 50 may be sucked from the sensor 50, moved to the storage tank 36, and then filtered by the air filter 110. The controller 40 may operate the compressor 120. If the compressor 120 is operated, negative pressure is created in the suction nozzle 32, the storage tank 36, and the inlet 122 of the compressor 120, and the air tank 130 is filled with air. That is to say, in this embodiment, the suction cleaning system 30 may be incorporated into the air cleaning system 10.

Figure 4:
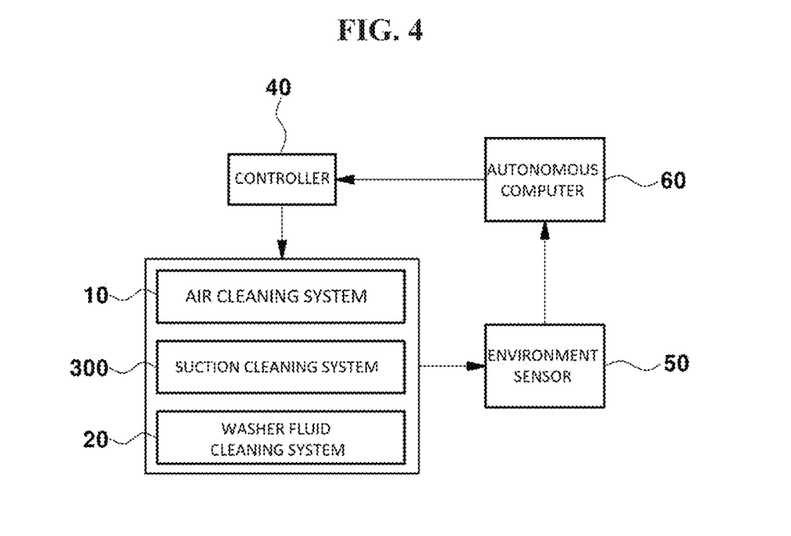
FIG. 4 is a diagram illustrating the configuration of a sensor cleaning system according to an embodiment of the present disclosure.
Figure 5:
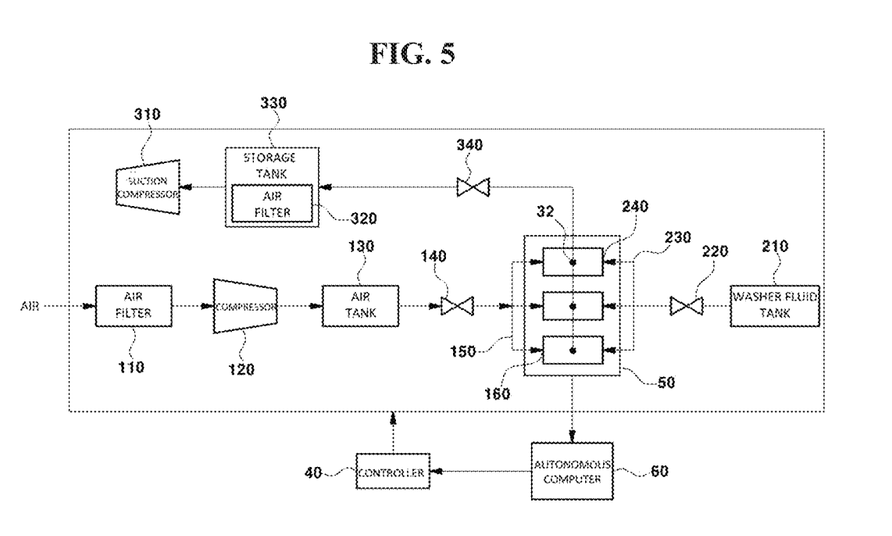
FIG. 5 is a detailed view of the sensor cleaning system of FIG. 4.

As shown in FIGS. 4 and 5, according to another embodiment of the present disclosure, a suction cleaning system 300 of the sensor cleaning system may be provided separately from the air cleaning system 10. This embodiment is similar in operation to the embodiment shown in FIG. 1 but may be distinguished from the embodiment of FIG. 1 in that it has a suction compressor 310, a suction air filter 320, a storage tank 330, and a suction valve 340, separately from the compressor 120 of the air cleaning system 10. If the suction valve 340 is opened and the suction compressor 310 is driven to perform suction cleaning, air from around the environment sensor 50 is sucked together with foreign substances through the suction nozzle 32. The sucked foreign substances may move to the storage tank 330 and then be filtered by the suction air filter 320.

Since the operation of the air cleaning system 10 and the washer fluid cleaning system 20 remains the same as the embodiment of FIG. 1, a repeated description thereof has been omitted. In this embodiment, there is no physical connection between the air cleaning system 10 and the suction cleaning system 300. That is to say, during the suction cleaning, air at the outlet of the suction compressor 310 is discharged to the atmosphere. In case of the compressor 120 in the embodiment of FIG. 1, it may be compared with the generation of compressed air that is to be filled in the air tank 130. This embodiment may be somewhat disadvantageous in terms of cost, weight, and air-filter replacement cost in that a separate suction compressor 310 is added. However, there is an advantage in that the degree of freedom increases in terms of design, such as selection of compressor specifications and changes in control methods.

Figure 6:
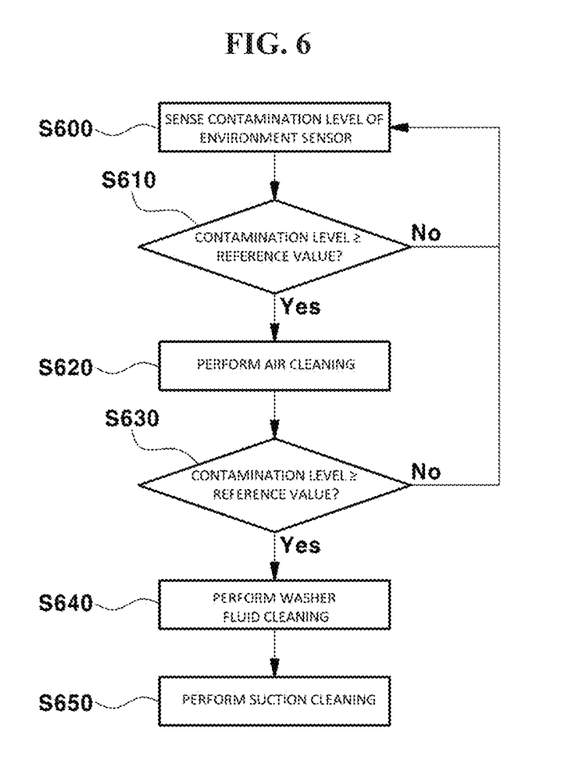
FIG. 6 illustrates a control flowchart of a sensor cleaning system according to an embodiment of the present disclosure.

FIG. 6 illustrates a flowchart showing an operation method of a sensor cleaning system according to an embodiment of the present disclosure. Contamination detection and operation of the sensor cleaning system may be performed together while the vehicle V is driving or stopped and is initiated when the vehicle is on, such as when the vehicle V is turned on.

At S600, the autonomous computer 60 is detecting the contamination of the environment sensor 50. The autonomous computer 60 determines whether the contamination level of the environment sensor 50 is equal to or greater than a preset reference value at S610. When it is determined that the contamination level is equal to or greater than the reference value (YES in S610), the autonomous computer 60 requests sensor cleaning to the controller 40. In some implementations, the contamination of the environment sensor 50 is immediately sensed by the controller 40 and the controller 40 may perform sensor cleaning by itself. If the contamination level is less than the reference value (NO in S610), the computer (or controller 40) continues detecting the level of contamination at S600.

At S620, first, the air cleaning system 10 of the sensor cleaning system is operated. The controller 40 may control the air valve 140 so that compressed air is sprayed onto the contaminated environment sensor 50 through the air nozzle 160.

After the air cleaning is performed, the autonomous computer 60 determines whether the cleaned environment sensor 50 has been properly cleaned. To this end, the controller 40 notifies the autonomous computer 60 of the end of the air cleaning cycle, and the autonomous computer 60 determines the contamination level of the environment sensor 50 again. To be more specific, the autonomous computer 60 determines again whether the contamination level of the environment sensor 50 is equal to or greater than the reference value at S630. When the contamination level of the environment sensor 50 is less than the reference value after air cleaning, the autonomous computer 60 returns to detecting the contamination level at S600 without requesting further cleaning. When the pressure of the air tank 130 checked by the controller 40 is less than the reference pressure, the controller may operate the compressor 120 to replenish the air tank 130 with the compressed air. In other embodiments, again, the controller 40 may perform the detection instead of a computer.

In contrast, when the contamination level of the environment sensor 50 is equal to or greater than the reference value at S630, the autonomous computer 60 may request cleaning to the controller 40 again. In response to the request, the controller 40 drives the washer fluid cleaning system 20 at S640. The controller 40 controls the washer fluid valve 220 to spray washer fluid onto the environment sensor 50 where contamination remains. Further, the controller 40 controls to perform suction cleaning at S650. In the embodiment shown in FIGS. 1 and 3, during the suction cleaning, the controller 40 may drive the compressor 120 to convey foreign substances on the environment sensor 50 to the storage tank 36 and simultaneously replenish the air tank 130 with air. In the embodiment shown in FIGS. 4 and 5, the controller 40 drives the suction cleaning system 300. To be more specific, the controller 40 opens the suction valve 340 to drive the suction compressor 310. Then foreign substances around the environment sensor 50 may be conveyed to the storage tank 330 and be filtered by the suction air filter 320.

When cleaning is completed, a cleaning completion signal is transmitted to the autonomous computer 60 again. The method then returns to detecting the sensor(s) 50 for contamination at S600.

The sensor cleaning system according to the present disclosure can prevent the appearance of the vehicle from being contaminated. The present disclosure includes the suction cleaning system to prevent the washer fluid or contaminant remaining on the environment sensor from secondarily contaminating the appearance of the vehicle. Thus, the sensor cleaning system according to the present disclosure can prevent damage to surrounding vehicles and pedestrians due to foreign substances.

According to the present disclosure, it is possible to reduce compressor operation time and power consumption for air replenishment. Since the air tank is replenished with air simultaneously with contaminant suction during suction cleaning, the number of operations of the compressor for filling the air tank with compressed air can be reduced and the operation cycle can be extended. Therefore, the number of times of air cleaning can be decreased in half, reducing air consumption. In addition, as the amount of power that is used is reduced, it can help improve the fuel efficiency of autonomous vehicles.

Although the present disclosure has been described with reference to specific embodiments shown in the drawings, it should be apparent to those having ordinary skill in the art that the embodiments of the present disclosure may be changed and modified in various ways without departing from the scope of the present disclosure, which is described in the following claims.

What is claimed is:

1. A sensor cleaning system comprising:
   an air cleaning system configured to clean sensor contamination by spraying compressed air;
   a washer fluid cleaning system configured to clean sensor contamination by spraying washer fluid;
   a suction cleaning system configured to suck sensor contamination; and
   a controller configured to
      communicate with the air cleaning system, the washer fluid cleaning system, and the suction cleaning system,
      determine operation of the air cleaning system based on a contamination level of sensor contamination being a first contamination level, and
      determine operation of the washer fluid cleaning system and the suction cleaning system based on the contamination level being a second contamination level.

2. The sensor cleaning system of claim 1, wherein the controller is configured to determine the contamination level based on a proportion of a contaminated area of an environment sensor and to operate one or more of the air cleaning system, the washer fluid cleaning system, and the suction cleaning system based on the contamination level.

3. The sensor cleaning system of claim 1, further comprising:
   an autonomous computer configured to determine a proportion of a contaminated area of an environment sensor and to communicate with the controller.

4. The sensor cleaning system of claim 1, wherein the air cleaning system comprises:
   a compressor configured to draw in air and generate compressed air;
   an air nozzle configured to fluidly communicate with the compressor and spray the compressed air onto an environment sensor; and
   an air valve disposed between the compressor and the air nozzle.

5. The sensor cleaning system of claim 4, wherein the air cleaning system further comprises:
   an air distributor configured to distribute the compressed air supplied through the air valve in a plurality of directions,
   wherein the distributed compressed air is directed to a plurality of environment sensors.

6. The sensor cleaning system of claim 4, wherein the air cleaning system further comprises:
   an air filter configured to filter the air drawn into the compressor.

7. The sensor cleaning system of claim 6, wherein the suction cleaning system comprises a suction nozzle arranged around the environment sensor, and wherein the suction nozzle is configured to communicate with the air filter and perform suction by a suction nozzle as the compressor is operated.

8. The sensor cleaning system of claim 7, wherein the suction cleaning system further comprises:
   a suction valve disposed between the air filter and a suction nozzle.

9. The sensor cleaning system of claim 4, wherein the suction cleaning system comprises:
   a suction nozzle arranged around the environment sensor;
   a suction compressor configured to suck air through the suction nozzle; and
   a suction air filter disposed between the suction nozzle and the suction compressor to filter the air sucked from the suction nozzle.

10. The sensor cleaning system of claim 1, wherein the washer fluid cleaning system comprises:
    a washer fluid tank storing the washer fluid;
    a washer fluid nozzle configured to fluidly communicate with the washer fluid tank and spray the washer fluid onto an environment sensor; and
    a washer fluid valve disposed between the washer fluid tank and the washer fluid nozzle.

11. The sensor cleaning system of claim 10, wherein the washer fluid cleaning system further comprises:
    a washer fluid distributor configured to distribute the washer fluid supplied through the washer fluid valve in a plurality of directions,
    wherein the distributed washer fluid is directed to a plurality of environment sensors.

12. The sensor cleaning system of claim 1, further comprising an environment sensor comprising at least one of a lidar, a radar, or a camera configured to sense surrounding environment of the environment sensor.

13. The sensor cleaning system of claim 1, wherein the second contamination level is the contamination level of an environment sensor after the environment sensor is cleaned using the air cleaning system.

14. A vehicle comprising the sensor cleaning system of claim 1.

15. A method for controlling a sensor cleaning system, the method comprising:
- receiving, by a controller, a first cleaning request for an environment sensor;
- causing, by the controller, an air cleaning system to spray compressed air onto the environment sensor;
- causing, by the controller, a washer fluid cleaning system to clean the environment sensor using washer fluid after the spray of the air cleaning system; and
- causing, by the controller, a suction cleaning system to suck around the environment sensor after the cleaning of the washer fluid cleaning system.

16. The method of claim 15, wherein the cleaning by the washer fluid cleaning system is performed based on a second cleaning request for the environment sensor is received.

17. The method of claim 16, wherein the second cleaning request is generated based on a contamination level of the environment sensor after spraying the compressed air.

18. The method of claim 15, wherein a suction operation of the suction cleaning system is performed using a compressor of the air cleaning system.

19. The method of claim 15, wherein causing the air cleaning system to spray compressed air onto the environment sensor includes:
- directing the compressed air stored in an air tank of the air cleaning system to the environment sensor through an air nozzle being in fluid communication with the air tank.

20. The method of claim 19, wherein:
- causing the suction cleaning system to suck around the environment sensor includes operating a compressor of the air cleaning system;
- the compressor is configured to supply compressed air to the air tank; and
- an inlet of the compressor is connected to a suction nozzle of the suction cleaning system via a storage tank including an air filter.

\* \* \* \* \*